No. 851,876. PATENTED APR. 30, 1907.
P. FRASER.
STRAIGHTWAY VALVE.
APPLICATION FILED APR. 3, 1906.

Witnesses:
R. Ovendale
F. Ovendale

Inventor:
Peter Fraser
by Chas. Ovendale
Attorney

UNITED STATES PATENT OFFICE.

PETER FRASER, OF JOHANNESBURG, TRANSVAAL.

STRAIGHTWAY VALVE.

No. 851,876.   Specification of Letters Patent.   Patented April 30, 1907.

Application filed April 3, 1906. Serial No. 309,671.

*To all whom it may concern:*

Be it known that I, PETER FRASER, a subject of the King of Great Britain, and a resident of Johannesburg, Transvaal, have invented certain new and useful Improvements in Straightway Valves, of which the following is a specification.

This invention relates to stop valves and in particular to that type known as straightway valves applicable for steam, water, or other fluid.

It is designed to so construct the valve as to render it impossible for sediment to accumulate on the bottom or on the valve face, which, with certain types of valves, interferes with their proper operation by rendering it difficult to close the same; to afford the valve face protection from the action of the fluid and sediment; to render the valve capable of resisting greater pressures; to obviate the use of screws and nuts in the valve, which are liable to be stripped and loosened and to come into contact with and damage the valve faces, and to obtain a tight valve face with a minimum of friction.

The improved valve is of simple design and consequently may be cheaply manufactured.

Figure 1:
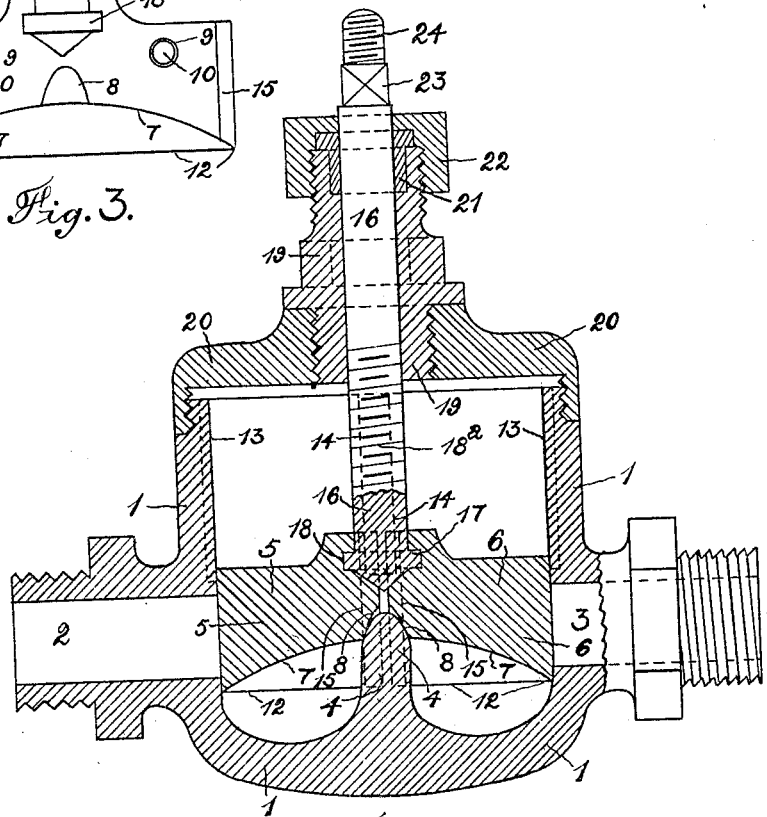
Figure 2:
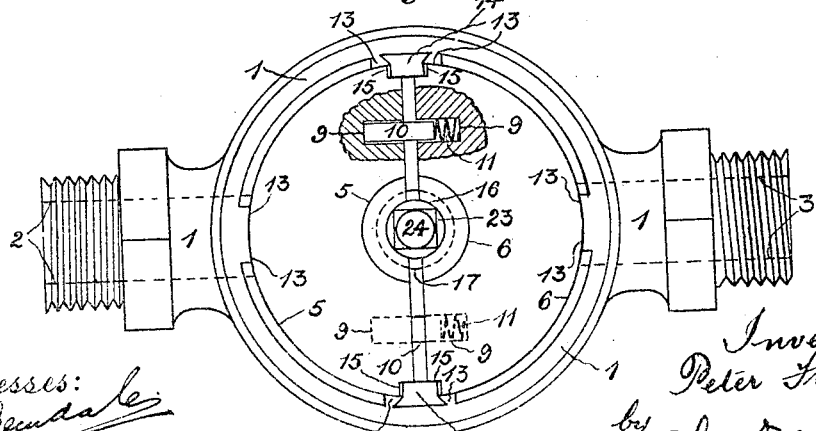

The invention will be described in detail by aid of the accompanying drawings, wherein, Figure 1 represents the valve in vertical section. Fig. 2 represents it in plan, partly in section, with the valve box cap removed, and Fig. 3 is an elevation of one half of the valve as seen from the inside.

1 represents the valve box or body which, as shown in plan, is made cylindrical and is constructed with inlet and outlet ports 2, 3, respectively, diametrically opposite each other as in straightway valves, communicating with the interior of the body.

In the bottom of the valve body 1 on the inside is formed a more or less cylindrical projection 4, which is made approximately conical at its upper end. The bottom of the valve box on the inside is suitably curved so that any sediment introduced into it will be prevented accumulating therein by being carried out through the outlet port 3 when the valve is opened. The projection 4 by preventing direct impact of the fluid in its passage through the valve, protects the valve face. The construction of the projection 4 at the bottom of the valve body 1 strengthens the valve body at this point, which, as is well known, is usually the weakest point in valves of this type.

Figure 3:
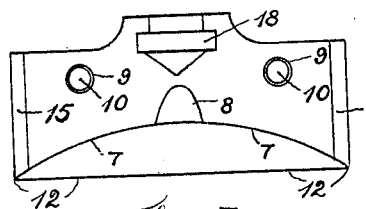

The valve proper consists of two hemi-cylinders 5, 6, one of which is shown in Fig. 3 which represents it as seen from the inside or plain face. The hemi-cylinders 5, 6, are constructed with a cavity or curved recess 7 in the underside, and at the center of said cavity 7 with an inner conical or approximately conical recess 8. When the halves 5, 6, of the valve are fitted together inside the body and are operated to close the valve, the conical upper end of the projection 4 enters the inner conical recess 8 and so forces the halves of the valve apart against the valve face. The halves 5, 6, of the valve on the inside are constructed with coincident cylindrical recesses 9 in which are placed dowel pins 10 and spiral springs 11, which serve for keeping the valves in correct relative position, and also tend to force them against the sides or walls of the valve body. The dowel pins 10, are as shown in the plan, located at opposite sides of the valve center.

The hollow formation of the valve on the underside allows any foreign matter entering the valve body with the fluid, to pass beneath the valve and away from the valve face. The valve exerts a slight pressure against the face in all parts of its travel, and the plow shaped or sharp lower edge 12 of the valve removes any matter that may be deposited on the valve face as it is lowered to close the ports 2, 3, which results in the lengthening of the life of the valve and face. By recessing the valve as described, the tendency is to keep the valve tight on its face should there be any leakage on the inlet port side.

The valve body 1 is constructed with fitting strips 13 for the valve and with guide keys 14 fitting dovetail slots in two of the fitting strips 13, and engaging vertical grooves 15 in the halves 5, 6, of the valve. The guide keys 14, as shown, are preferably located diametrically opposite each other. These keys 14, which serve for guiding the valve as it is raised and lowered, also prevent the valve rotating inside the body 1.

The spindle 16 for actuating the valve may be of any ordinary construction. It is shown formed on its lower extremity with an annular projection 17 fitting a correspondingly shaped recess 18 formed in the parallel inner faces of the halves 5, 6, of the valve. The spindle 16 is formed with a screw-thread $18^a$ for a portion of its length, which screws through a nut 19 fixed to the cap or cover 20 of the valve box or body 1. At the top the spindle 16 passes through the ordinary gland 21 and stuffing box 22. The outer extremity of the spindle 16 may be constructed with a square 23 to receive a handwheel (not shown), and beyond the square 23 with a threaded portion 24 to receive a nut for securing the wheel on the spindle 16.

What I claim as my invention and desire to protect by Letters Patent is:—

In a valve, the combination with the body providing a cylindrical chamber and inlet and outlet ports communicating therewith, said body being constructed with an internal vertical projection substantially conical at its upper end, and with fitting strips and slots for guide keys, of a valve consisting of two hemi-cylinders hollowed on the underside and formed with an inner recess at the bottom of said hollow which inner recess engages the conical upper extremity of the projection to force the halves of the valve asunder to close the valve, guide keys fitted in the body and engaging slots in the halves of the valve, dowel pins and springs between the halves of the valve, and a spindle for raising and lowering the valve inside the casing.

In witness whereof I have hereunto set my hand in the presence of two subscribing witnesses.

PETER FRASER.

Witnesses:
CHAS. OVENDALE,
R. OVENDALE.